(12) United States Patent
Huff et al.

(10) Patent No.: US 6,211,892 B1
(45) Date of Patent: Apr. 3, 2001

(54) SYSTEM AND METHOD FOR PERFORMING AN INTRA-ADD OPERATION

(75) Inventors: Thomas Huff; Shreekant S. Thakkar, both of Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/053,389

(22) Filed: Mar. 31, 1998

(51) Int. Cl.[7] .................................................. G06T 15/22
(52) U.S. Cl. ........................ 345/524; 345/506; 345/522; 708/607
(58) Field of Search ........................ 345/501–506, 345/522; 708/607; 712/41, 222, 300

(56) References Cited

U.S. PATENT DOCUMENTS

| | | | |
|---|---|---|---|
| 5,390,135 | * 2/1995 | Lee et al. ............................ | 708/518 |
| 5,677,862 | * 10/1997 | Peleg et al. . | |
| 5,815,421 | * 9/1998 | Dulong et al. ...................... | 708/520 |
| 5,819,117 | * 10/1998 | Hansen . | |
| 5,822,232 | * 10/1998 | Dulong et al. ...................... | 708/308 |
| 5,862,067 | * 1/1999 | Mennemeier et al. . | |
| 5,875,355 | * 2/1999 | Sidwell et al. . | |
| 5,883,824 | * 3/1999 | Lee et al. ............................ | 708/445 |
| 6,006,316 | * 12/1999 | Dinkjian . | |
| 6,014,684 | * 1/2000 | Hoffman . | |
| 6,115,812 | * 9/2000 | Abdallah et al. .................... | 712/300 |

OTHER PUBLICATIONS

J.F.Takie, et al., "Comparison Of Some Parallel Matrix Multiplication Algorithms", 8th Mediterranean Electrotechnical Conference, Melecon'96, vol. 1, 1996, pp. 155–158.*
H. Barad, et al., "Intel's Multimedia Architecture Extension", Nineteenth Conventio Of Electrical And Electronics Engineers In Israel, 1996, pp. 148–151.*
Visual Instruction Set (VIS™) User's Guide, Sun Microsystems, Version 1.1, Mar. 1997.
AMD–3D Technology Manual, AMD, Publication No.: 21928, Issued Date: Feb. 1998.

* cited by examiner

Primary Examiner—Ulka J. Chauhan
(74) Attorney, Agent, or Firm—Blakely, Sokoloff, Taylor & Zafman LLP

(57) ABSTRACT

An apparatus and method for performing an intra-add operation on packed data using computer-implemented steps is described. A processor is coupled to a hardware unit which transmits data representing graphics to another computer or display. A storage device coupled to the processor, has stored therein a routine, which, when executed by the processor, causes the processor to generate the data. The routine causes the processor to at least access a first packed data operand having at least one pair of data elements; swap positions of the data elements within the at least one pair of data elements to generate a second packed data operand, add data elements starting at the same bit positions from the first and second packed data operands to generate a third packed data operand.

15 Claims, 8 Drawing Sheets

SYSTEM AND METHOD FOR PERFORMING AN INTRA-ADD OPERATION

RELATED APPLICATIONS

The invention is related to co-pending U.S. patent application Ser. No. 09/053,401 entitled "Method and Apparatus for performing intra-add operation", filed Mar. 31, 1998 which is assigned to the assignee of the present application.

BACKGROUND OF THE INVENTION

1. Field of the Invention

The present invention relates in general to the field of computer systems, and in particular, to an apparatus and method for performing multi-dimensional computations based on an intra-add operation.

2. Description of the Related Art

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed with one instruction, resulting in significant performance improvement.

Currently, the SIMD addition operation only performs "vertical" or inter-register addition, where pairs of data elements, for example, a first element Xn (where n is an integer) from one operand, and a second element Yn from a second operand, are added together. An example of such a vertical addition operation is shown in Table 1, where the instruction is performed on the sets of data elements ($a_1$ and $a_2$) and ($b_1$ and $b_2$) accessed as Source1 and Source2, respectively.

TABLE 1

| $A_1$ | $A_2$ | Source1 |
|---|---|---|

| $B_1$ | $B_2$ | Source2 |
|---|---|---|

| $A_1+B_1$ | $A_2+B_2$ | Result |
|---|---|---|

Although many applications currently in use can take advantage of such a vertical add operation, there are a number of important applications that require the rearrangement of the data elements before the vertical add operation can be implemented so as to provide realization of the application.

For example, a matrix multiplication operation is shown below:

$$\text{MATRIX } A \ast \text{VECTOR } X = \text{VECTOR } Y$$

$$\begin{array}{l}\text{ROW 1}\\\text{ROW 2}\\\text{ROW 3}\\\text{ROW 4}\end{array}\begin{bmatrix}A_{11}A_{12}A_{13}A_{14}\\A_{21}A_{22}A_{23}A_{24}\\A_{31}A_{32}A_{33}A_{34}\\A_{41}A_{42}A_{43}A_{44}\end{bmatrix}\times\begin{bmatrix}X_1\\X_2\\X_3\\X_4\end{bmatrix}=\begin{bmatrix}A_{11}X_1+A_{12}X_2+A_{13}X_3+A_{14}X_4\\A_{21}X_1+A_{22}X_2+A_{23}X_3+A_{24}X_4\\A_{31}X_1+A_{32}X_2+A_{33}X_3+A_{34}X_4\\A_{41}X_1+A_{42}X_2+A_{43}X_3+A_{44}X_4\end{bmatrix}$$

To obtain the product of a matrix A with a vector X to obtain the resulting vector Y, instructions are used to: 1) store the columns of the matrix A as packed operands (this typically requires rearrangement of data because the rows of the matrix A coefficients are stored to be accessed as packed data operands, not as columns); 2) store a set of packed operands that each have a different one of the vector X coefficients in every data element; 3) use vertical multiplication as shown in Tables 2A–2D; and 3) use vertical adds as shown in Tables 2E–2G.

TABLE 2A

| $X_1$ | $X_1$ | $X_1$ | $X_1$ | SourceX1 |
|---|---|---|---|---|

| $A_{41}$ | $A_{31}$ | $A_{21}$ | $A_{11}$ | SourceA1 |
|---|---|---|---|---|

| $A_{41}X_1$ | $A_{31}X_1$ | $A_{21}X_1$ | $A_{11}X_1$ | IResult1 |
|---|---|---|---|---|

TABLE 2B

| $X_2$ | $X_2$ | $X_2$ | $X_2$ | SourceX2 |
|---|---|---|---|---|

| $A_{42}$ | $A_{32}$ | $A_{22}$ | $A_{12}$ | SourceA2 |
|---|---|---|---|---|

| $A_{42}X_2$ | $A_{32}X_2$ | $A_{22}X_2$ | $A_{12}X_2$ | IResult2 |
|---|---|---|---|---|

TABLE 2C

| $X_3$ | $X_3$ | $X_3$ | $X_3$ | SourceX3 |
|---|---|---|---|---|

| $A_{43}$ | $A_{33}$ | $A_{23}$ | $A_{13}$ | SourceA3 |
|---|---|---|---|---|

| $A_{43}X_3$ | $A_{33}X_3$ | $A_{23}X_3$ | $A_{13}X_3$ | IResult3 |
|---|---|---|---|---|

TABLE 2D

| $X_4$ | $X_4$ | $X_4$ | $X_4$ | SourceX4 |
|---|---|---|---|---|

| $A_{44}$ | $A_{34}$ | $A_{24}$ | $A_{14}$ | SourceA4 |
|---|---|---|---|---|

TABLE 2D-continued

| $A_{44}X_4$ | $A_{34}X_4$ | $A_{24}X_4$ | $A_{14}X_4$ | IResult4 |

TABLE 2E

| $A_{43}X_3$ | $X_{33}X_3$ | $A_{23}X_3$ | $A_{13}X_3$ | IResult3 |

| $A_{44}X_4$ | $A_{34}X_4$ | $A_{24}X_4$ | $A_{14}X_4$ | IResult4 |

| $A_{44}X_4+A_{43}X_3$ | $A_{34}X_4+A_{33}X_3$ | $A_{24}X_4+A_{23}X_3$ | $A_{14}X_4+A_{13}X_3$ | IIResult1 |

TABLE 2F

| $A_{41}X_1$ | $A_{31}X_1$ | $A_{21}X_1$ | $A_{11}X_1$ | IResult1 |

| $A_{42}X_2$ | $A_{32}X_2$ | $A_{22}X_2$ | $A_{12}X_2$ | IResult2 |

| $A_{42}X_2+A_{41}X_1$ | $A_{32}X_2+A_{31}X_1$ | $A_{22}X_2+A_{21}X_1$ | $A_{12}X_2+A_{11}X_1$ | IIResult2 |

TABLE 2G

| $A_{44}X_4+A_{43}X_3$ | $A_{34}X_4+X_{33}X_3$ | $A_{24}X_4+A_{23}X_3$ | $A_{14}X_4+A_{13}X_3$ | IIResult1 |

| $A_{42}X_2+A_{41}X_1$ | $A_{32}X_2+A_{31}X_1$ | $A_{22}X_2+A_{21}X_1$ | $A_{12}X_2+A_{11}X_1$ | IIResult2 |

| $A_{44}X_4+A_{43}X_3+A_{42}X_2+A_{41}X_1$ | $A_{34}X_4+A_{33}X_3+A_{32}X_2+A_{31}X_1$ | $A_{24}X_4+A_{23}X_3+A_{22}X_2+A_{21}X_1$ | $A_{14}X_4+A_{13}X_3+A_{12}X_2+A_{11}X_1$ | Result |

Accordingly, there is a need in the technology for a method and operation for increasing code density by eliminating the need for the rearrangement of data elements and the corresponding rearrangement operations.

BRIEF SUMMARY OF THE INVENTION

An apparatus and method for performing an intra-add operation on packed data using computer-implemented steps is described. A processor is coupled to a hardware unit which transmits data representing graphics to another computer or display. A storage device coupled to the processor, has stored therein a routine, which, when executed by the processor, causes the processor to generate the data. The routine causes the processor to at least access a first packed data operand having at least one pair of data elements; swap positions of the data elements within the at least one pair of data elements to generate a second packed data operand, add data elements starting at the same bit positions from the first and second packed data operands to generate a third packed data operand.

BRIEF DESCRIPTION OF THE DRAWINGS

The invention is illustrated by way of example, and not limitation, in the figures. Like reference indicate similar elements.

DETAILED DESCRIPTION OF THE INVENTION

In the following description, numerous specific details are set forth to provide thorough understanding of the invention. However, it is understood that the invention may be practiced without these specific details. In other instances, well-known circuits, structures and techniques have not been shown in detail in order not to obscure the invention.

According to one aspect of the invention, a method and apparatus are described for summing data elements in a packed data operand (a horizontal-add or an intra-add operation). According to another aspect of the invention, a method and apparatus for performing matrix multiplication using horizontal-add (or intra-add) operation is described.

Although a horizontal-add or an intra-add operation is described herein, a horizontal subtract or an intra-subtract operation may also be performed on packed data based on the principles of the invention.

COMPUTER SYSTEM

Figure 1:
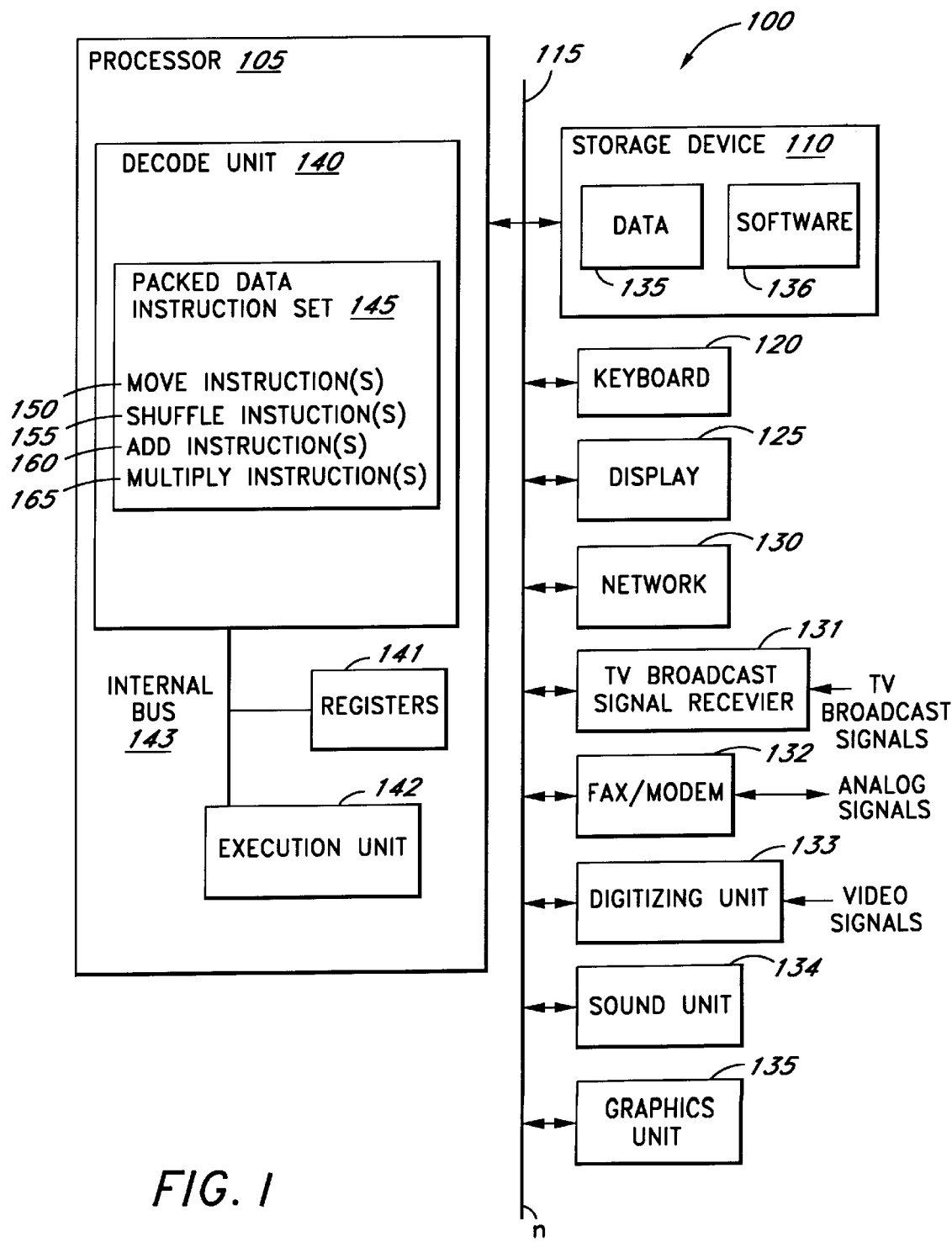
FIG. 1 illustrates an exemplary computer system in accordance with one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as multithreaded CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIGS. 3–6. Of course, the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. Of course, the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a move instruction(s) 150, a shuffle instruction(s) 155, an add instruction(s) (such as ADDPS) 160, and a multiply instruction(s) 165. The MOVAPS, SHUFPS and ADDPS instructions are applicable to packed floating point data, in which the results of an operation between two sets of numbers having a predetermined number of bits, are stored in a register having is the same as that of the result register. The operation of each of these instructions is further described herin. While one embodiment is described in which the packed data instructions operate on floating point data, alternative embodiments could alternatively or additionally have simalar instructions that operate on integer data.

In addition to the packed data instructions, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium® processor. Alternative embodiments of the invention may contain more or less, as well as packed data instructions operate on floating point data, alternative embodiments could alternatively or additionally have similar instructions that operate on integer data.

The registers 141 represent a storage are on processor 105 for storing information, including control/status information, integer data, floating point data, and packed data. It is understood that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

In one embodiment of the invention, the processor 105, executing the packed data instructions, can operate on packed data in several different packed data formats. For example, in one embodiment, packed data can be operated on in one of four formats: a "packed byte" format (e.g., PADDb), a "packed word" format (e.g., PADDw), a "packed double word" (dword) format (e.g., PADDd); or a "packed quad word" (qword) format (e.g., PADDq). The packed byte format includes eight separate 8-bit data elements; the packed word format includes four separate 16-bit data elements; the packed dword format includes two separate 32-bit data elements 16-bit data elements; the packed quad word format includes one 64-bit data element. While certain instructions are discussed below with reference to one or two packed data formats, the instructions may be similarly applied the other packed data formats of the invention. Additionally, many of the instructions of packed data instruction set 145 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. If the saturation avoids the effects of data overflow or underflow. If the operation is performed without saturation, the data may be truncated or may indicate a data overflow or underflow in another manner.

Figure 2:
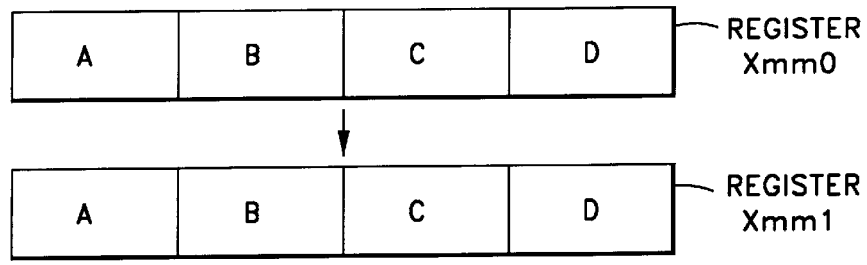
FIG. 2 illustrates the operation of the move instruction in accordance with one embodiment of the invention.

FIG. 2 illustrates the operation of the move instruction 150 according to one embodiment of the invention. In this example, the move instruction 150 (MOVAPPS) moves bits of data from one register to another register or from one memory location to another. In one embodiment, 128-bits representing 4 packed single data from one memory location to another or from one register to another.

Figure 3:
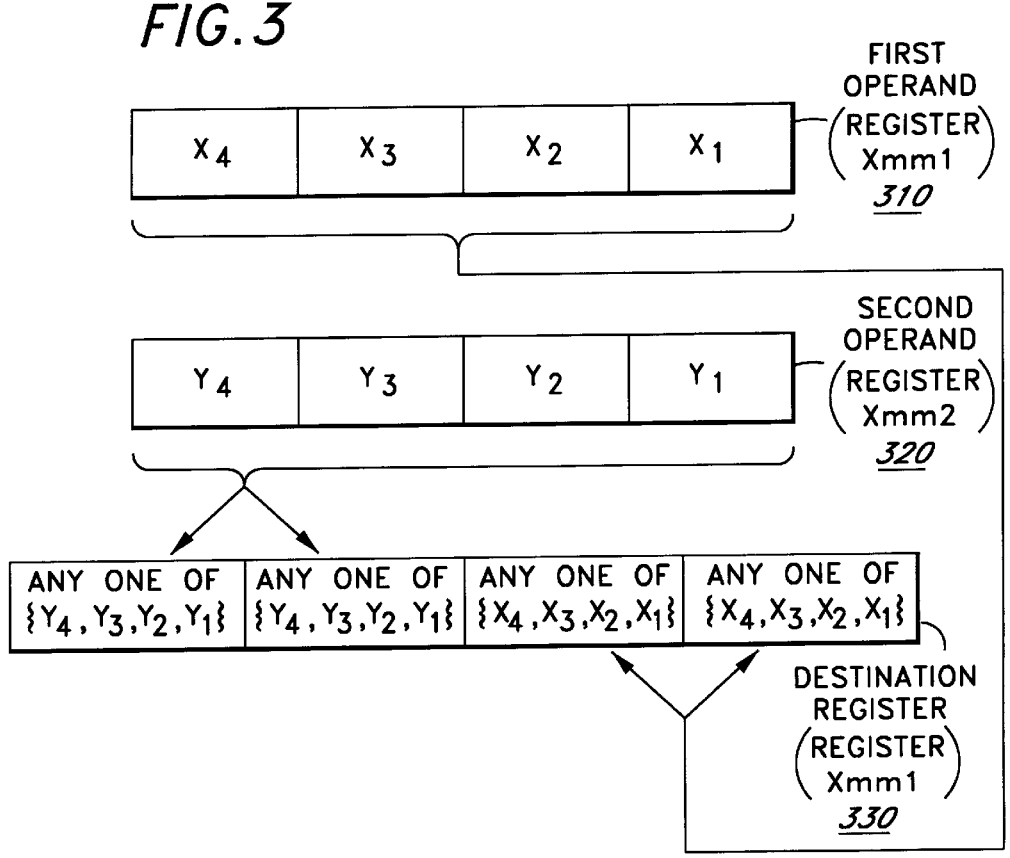
FIG. 3 illustrates the operation of the shuffle instruction in accordance with one embodiment of the invention.

FIG. 3 illustrates the operation of the shuffle instruction 155 according to one embodiment of the invention. In one embodiment, the shuffle instruction 155 (SHUFPS) is able to shuffle any one of a plurality (e.g., four) single floating point (FP) numbers from a first operand 310 to the lower 2 destination fields of a destination register 330; the upper 2 destination fields are generated from a shuffle of any one of a plurality (e.g., four) single FP numbers from a second operand 320.

Figure 4:
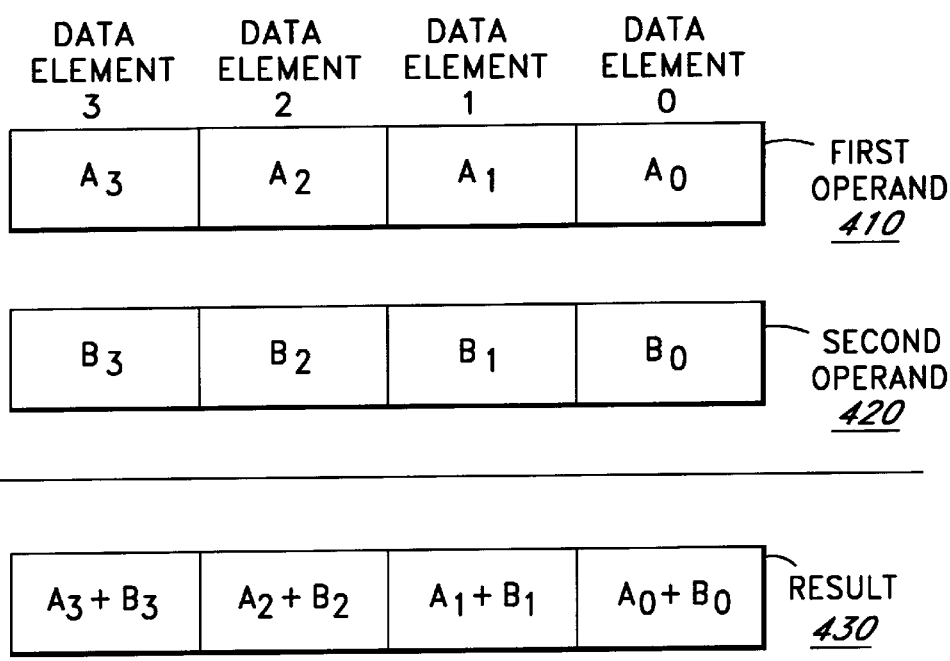
FIG. 4 illustrates the operation of the inter-add instruction in accordance with one embodiment of the invention.

FIG. 4 illustrates the operation of the packed vertical instruction 160 according to one embodiment of the invention. In one embodiment, the packed vertical operation is the add instruction (ADDPS) 160, which operates on the data elements of a first to operand 410 and a second operand 420. In particular, the data elements of a first operand 410 are added to the respective packed data elements of a second operand 420 to generate a result 430. For example, data elements of a second operand 420 to generate a result 430. For example, data element 0 of the first operand 410 is added to data element 0 the second operand 420 and the result is stored as data element 0 of the result 430. The packed subtract instruction acts in a similar manner to the packed add instruction, except subtraction's are performed.

HORIZONTAL ADD OPERATIONS

Figure 5A:
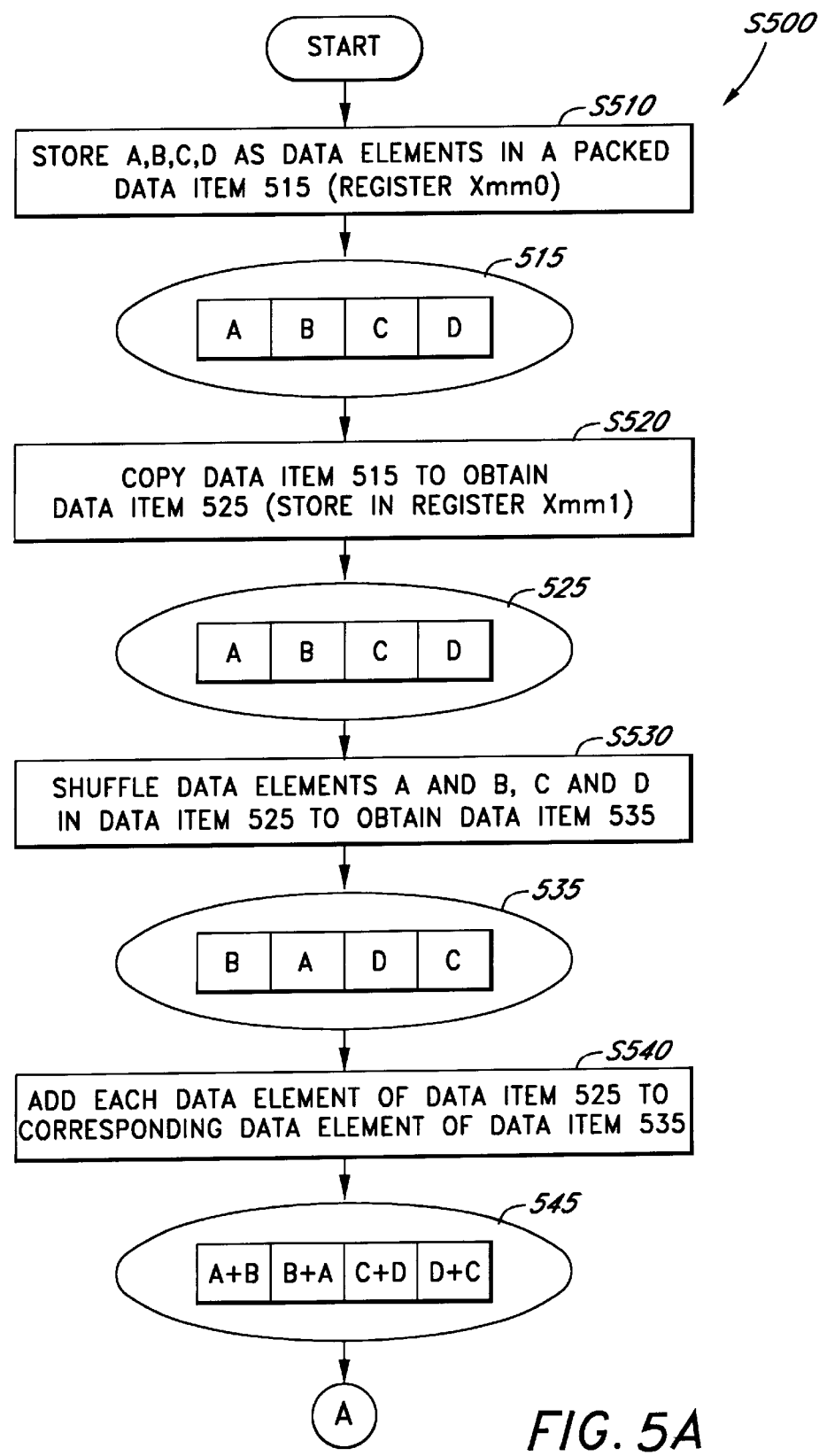
FIG. 5 is a flow diagram illustrating one embodiment of the general steps used by the processor of FIG. 1 to manipulate data in performing the intra-add operation, in accordance with one embodiment of the invention.
Figure 5B:
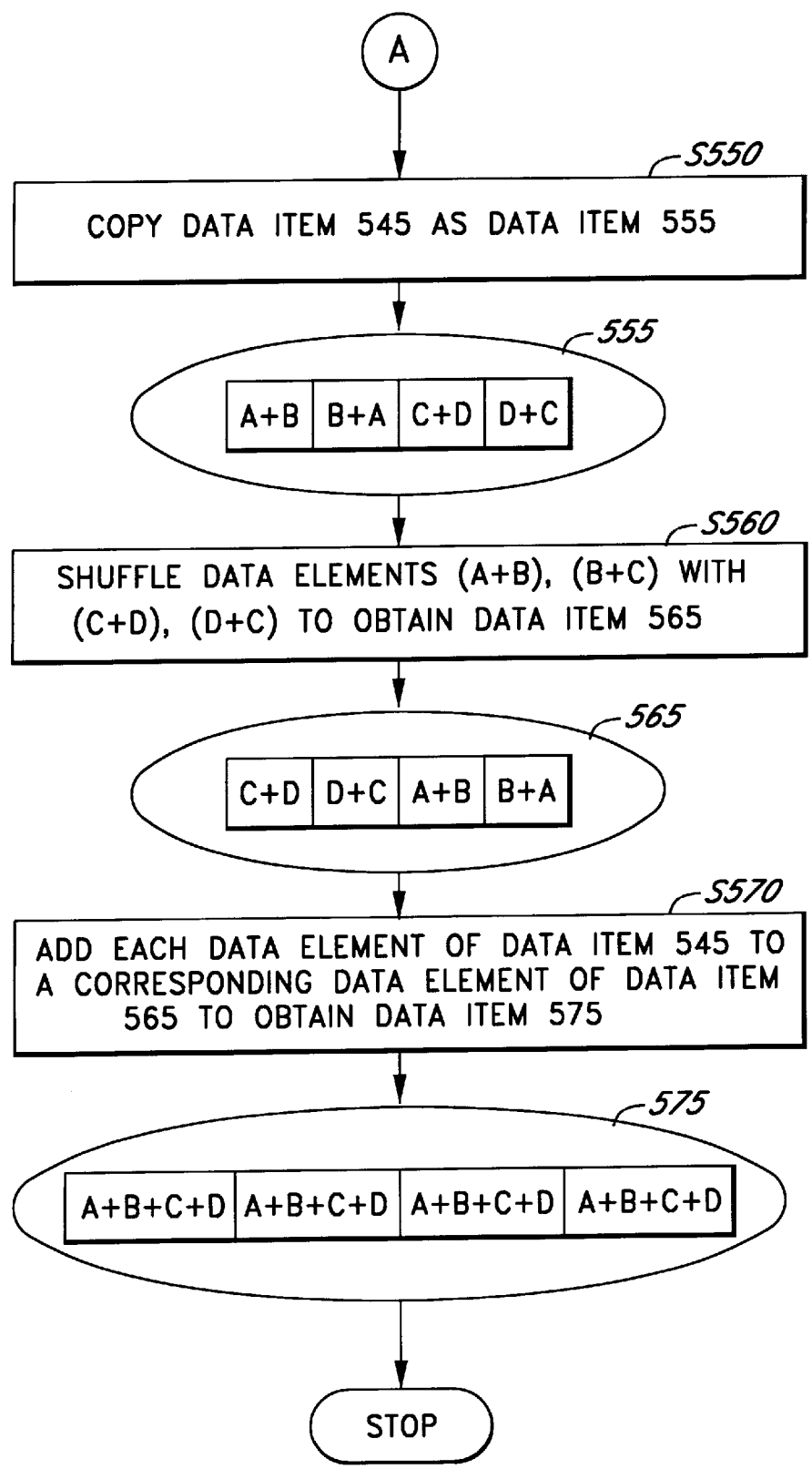

FIG. 5 illustrates a technique for performing an intra-add operation on four numbers according to one embodiment of the invention. In this application, data is represented by ovals, while instructions are represented by rectangles. Beginning from a start state, the process S500 proceeds to process step S510, where numbers A, B, C and D are stored as data elements in a packed data item 315. For present discussion purposes, each data element is 32-bits wide, and the operand to be horizontally summed or intra-register added, is contained in register xmm0, in the following order:

|A|B|C|D|

The process S500 then proceeds to process step S520, where a move instruction (MOVAPS) is performed on the packed data item 315, to copy the contents of the register xmm0 to register xmm1. This is performed to retain the original contents of register xmm0 during the intra-add operation. The result of the MOVAPS instruction is packed data item 325. The process S500 then proceeds to process step S530, where a shuffle instruction (SHUFPS) is performed on the contents of register xmm1 to swap the order of the numbers A and B, and C and D, to obtain a data item 335 of the following order:

|B|A|D|C|

The process S500 then advances to process step S540, where an add instruction (ADDPS) is performed on the contents of the register xmm1 (data item 335) and the contents of the register xmm0 (data item 315), so as to add the data items A and B, and C and D. In particular, each data element of data item 315 is added to a corresponding data item 335. The resulting data item 345 stored in register xmm0 may be expressed as follows:

|A+B|B+A|C+D|D+C| or

|A+B|A+B|C+D|C+D|

The process S500 then proceeds to process step S550, where a move instruction (MOVAPS) is performed on the packed data item 345, to copy the contents of the register xmm0 (i.e., data item 345) to register xmm1 to obtain data item 355. The process S500 advances to process step S560, where a shuffle instruction (SHUFPS) is performed on the contents of register xmm1 to swap data the order of data elements (A+B) in the upper two fields of the register xmm1 with (C+D) in the lower two fields of the register xmm1. The resulting data item 365, may be expressed as follows:

|C+D|D+C|A+B|B+A| or

|C+D|C+D|A+B|A+B|

The process S500 then advances to process step S570, where each data element of data item 365 (i.e., the contents of register xmm1) are added to a corresponding data element of data item 345 (i.e., to the contents of register xmm0). The resulting data item 375, is:

|A+B+C+D|A+B+C+D|A+B+C+D|A+B+C+D|

Accordingly, an intra-add operation of the elements in a single operand is performed. Although FIG. 5 illustrates an example of the horizontal-add or the inter-add operation, with the availability of a packed subtract instruction, a packed horizontal-subtract or inter-subtract operation may also be performed by replacing use of the vertical add instruction(s) 160 with a packed subtract instruction.

In addition, although the example in FIG. 5 describes data operands having four data elements, the principles of invention may also be implemented in data operands having at least two elements.

Figure 6A:
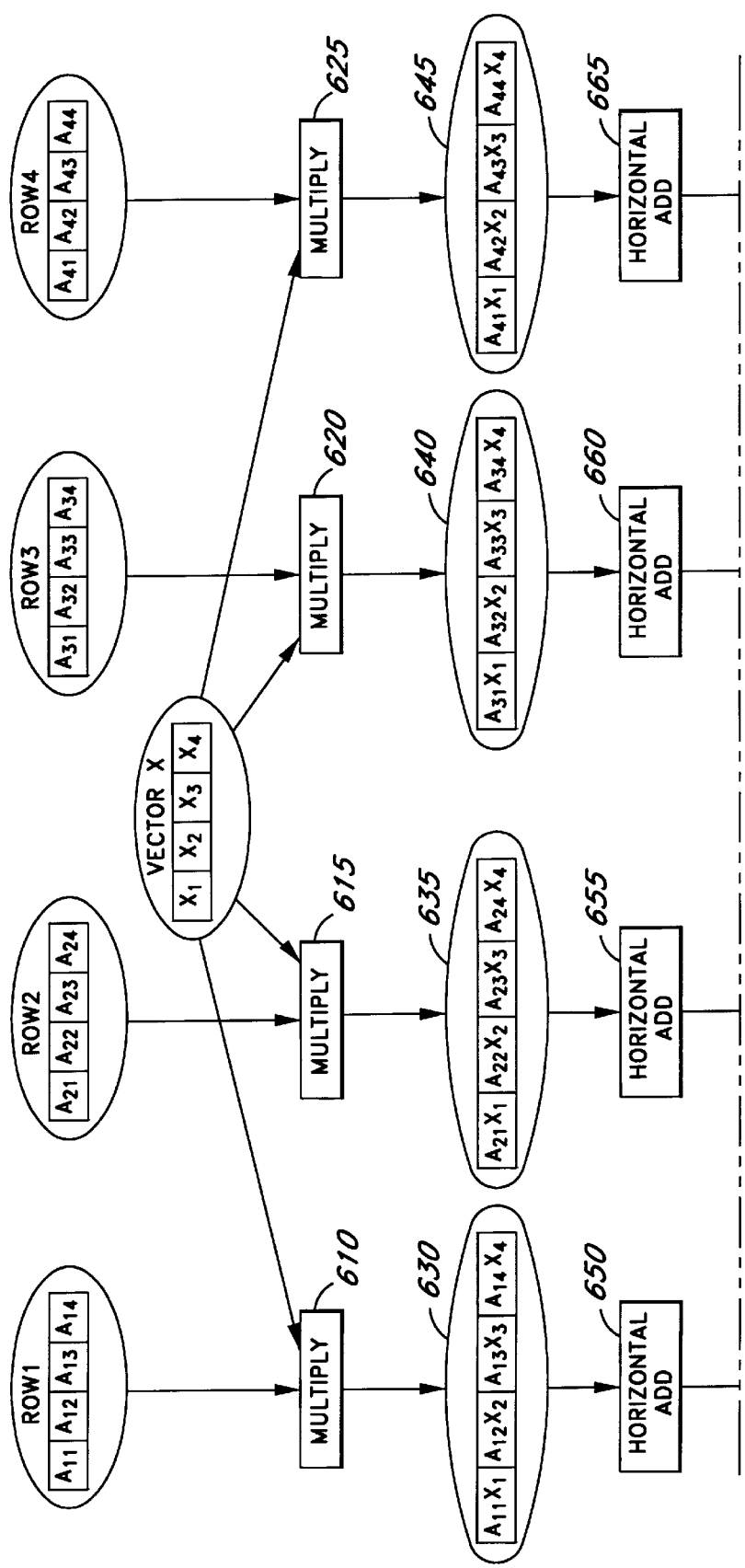
FIG. 6 is a data flow diagram illustrating the use of the horizontal-add (or intra-add) operations for performing matrix multiplication in accordance with the principles of the invention.
Figure 6B:
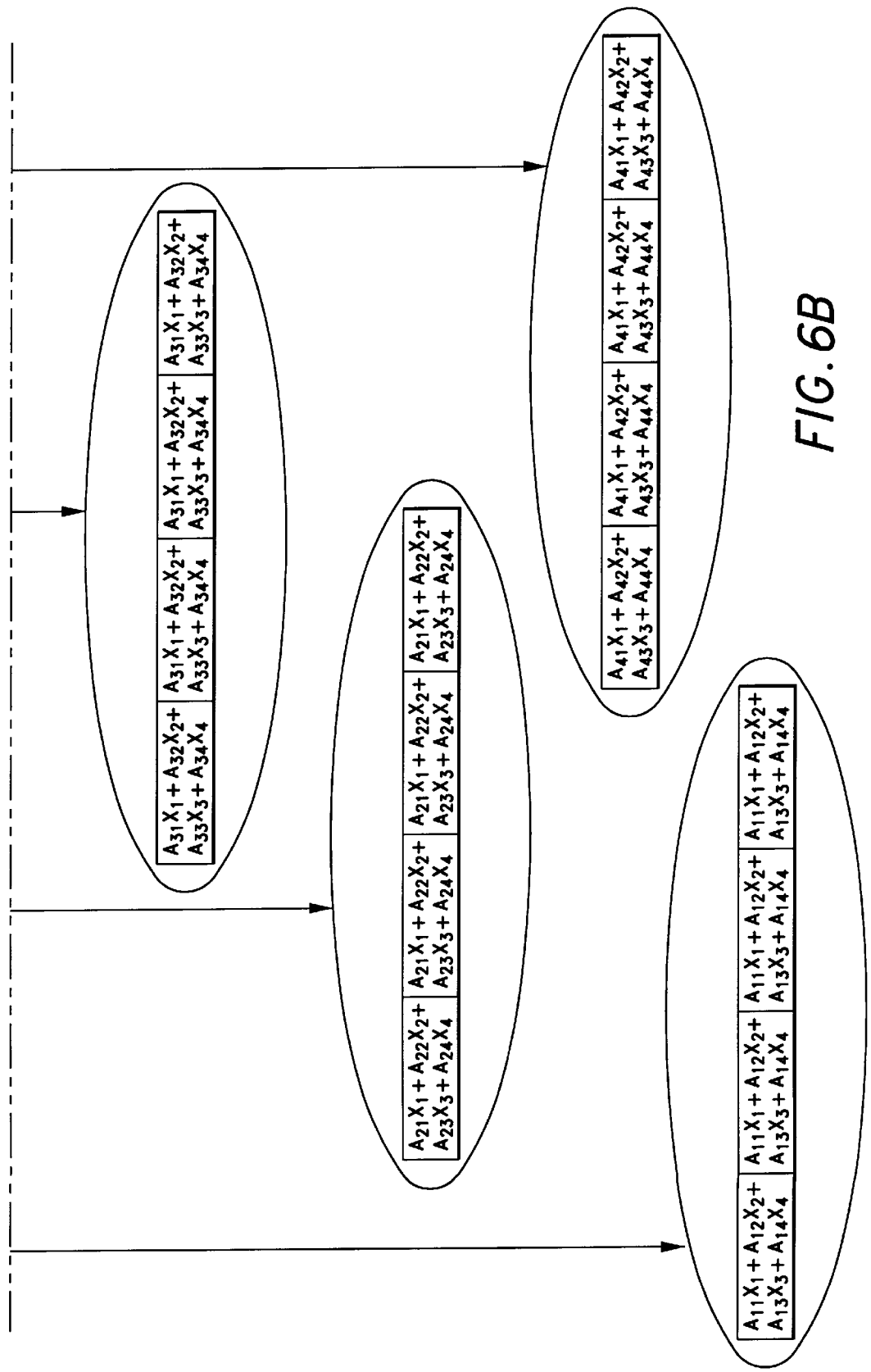

FIG. 6 is a data flow diagram illustrating the use of the horizontal-add (or intra-add) operations described above to perform matrix multiplication. FIG. 6 shows the four rows of the Matrix A stored as separate packed data operands. Due to the way a matrix is typically stored in memory, the rows of the Matrix A can be accessed as packed data without the need for rearranging data elements, as is required in performing matrix multiplication using conventional techniques. In addition, FIG. 6 shows the vector X stored as a packed data operand. As shown in steps S610, S615, S620, and S625, a vertical packed data multiply is performed between each row of the Matrix A and the vector X. As a result of the multiplications, four packed data operands are generated (630, 635, 640, 645). Since the respective sum of the data elements in each of the packed operands 630, 635, 640, and 645 is one of the coefficients in vector Y, horizontal-add (or intra-add) operations 650, 655, 660, 665, as described above, are respectively performed in each of the packed operands 630, 635, 640 and 645 to generate the results of the matrix multiplications. Thus, in addition to not having to rearrange the coefficients of the Matrix A so that the columns may be accessed as packed data operands, the method of FIG. 6 also does not require the generation of a set of packed data operands that each have a different one of the vector X coefficients in every data element.

Figure 7:
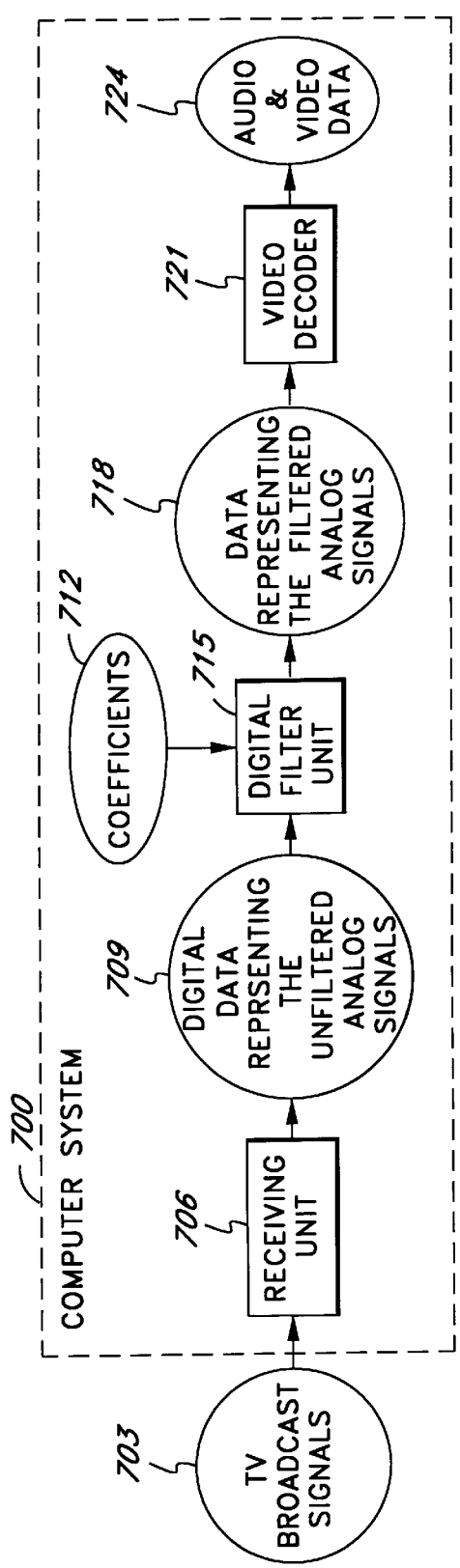
FIG. 7 is a general block diagram illustrating the usage of a digital filter which utilizes matrix multiplication based on horizontal or intra-add operations, for filtering a TV broadcast signal in accordance with one embodiment of the invention.

FIG. 7 is a general block diagram illustrating the use of a digital filter which utilizes matrix multiplication based on a horizontal an intra-add operation for filtering a TV broadcast signal according to one embodiment of the invention. FIG. 7 shows TV broadcast signals 703 representing a television broadcast being received by a receiving unit 706 of a computer system 700. The receiving unit 706 receives the TV broadcast signals 703 and transforms them into digital data 709. A digital filter unit 715 performs a digital filter (e.g., FIR, IIR, etc.) on the digital data 709 using a set of coefficients 712. As a result, the digital filter unit 715 generates filtered data 718 (also termed as "filtered data items") representing the filtered analog TV broadcast signals. In performing the filtering operation, matrix multiplication based on intra-add operations is implemented. The filtered data 718 is received by a video decoder 721 for conversion into and audio & video data 724. The techniques performed by video decoder 721 are well known (see Jack, Smith, Keith, "NTSC/PAL Digital Decoder", Video Demystified, High Text Publications, Inc., 1993) The audio and video data can be used for any purpose (e.g., display on a screen).

In one embodiment, the computer system 100 shown in FIG. 1 is used to implement the computer system 700 in FIG. 7. In this embodiment, the TV broadcast signal receiver 131 acts as the receiving unit 706 and may include a TV tuner, an analog to digital converter, and a DMA channel. The TV broadcast signals 703 are received by the TV tuner, converted into digital data by the analog to digital converter, and then sorted in the storage device 110 by the DMA channel. Of course, the digital data sorted by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the intra-register addition as described with reference to FIGS. 2 and 3. Of course, the receiving unit 706 may encompass additional hardware, software, and/or firmware in the TV broadcast signal receiver 131 or software executing on the processor 105. For example, additional software may be sorted in the storage device 110 for further processing the data prior to the digital filter being performed.

In this embodiment, the digital filter unit 718 is implemented using the processor 105 and the software 136 to perform the a digital filter. In this embodiment, the processor 105, executing the software 136, performs the digital filter using matrix multiplication based on intra-add operations, and stores the filtered data 718 in storage device 110. In this manner, the digital filter is performed by the host processor of the computer system, rather than the TV broadcast signal receiver 131. As a result, the complexity of the TV broadcast signal receiver 131 is reduced. In this embodiment, the video decoder 721 may be implemented in any number of different combinations of hardware, software, and/or firmware. The audio and video data 724 can then be sorted, and/or displayed on the display 125 and the sound unit 134, respectively.

Figure 8:
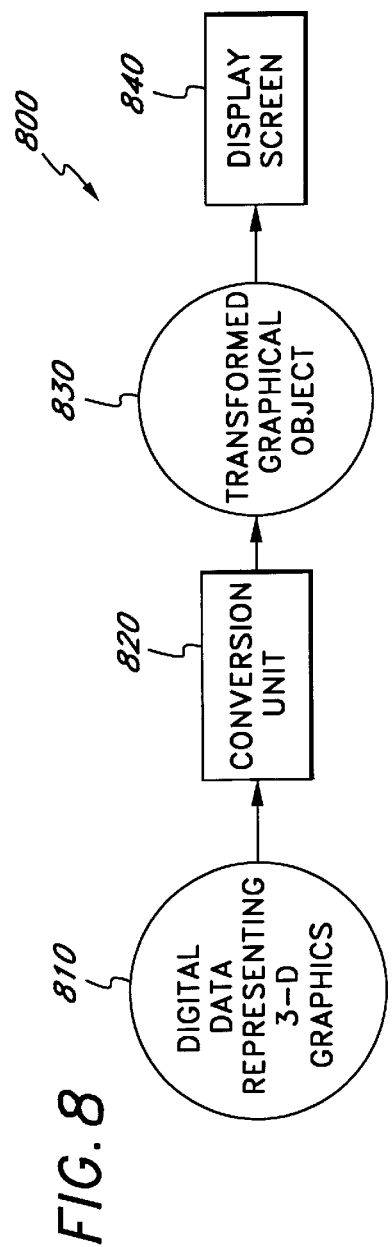
FIG. 8 is a general block diagram illustrating the use of matrix multiplication based on horizontal-add or intra-add operations, in rendering graphical objects in animation.

FIG. 8 is a general block diagram illustrating the use of matrix multiplication based on a horizontal or intra-add operation for rendering graphical objects in animation according to one embodiment of the invention. FIG. 8 shows a computer system 800 containing digital data 755 representing 3-dimensional (3D) graphics. The digital data 810 may be stored on a CD ROM or other type of storage device for later use. At sometime, the conversion unit 760 performs alteration of data using 3D geometry which includes the use of matrix multiplication based on a horizontal-add (or intra-add) operation to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the 30 graphics operation 800 from FIG. 8. In this embodiment, the digital data 810 from FIG. 8 is any data stored in the storage device 110 representing 3D graphics. In one embodiment, the conversion unit 820 from FIG. 8 is implemented using the processor 105 and the software 136 to alter data using 3D geometry. An example of such alteration of data includes the performance of a 3D transformation. In this embodiment, the processor 105, executing the software 136, performs the transformation and stores the transformed data 830 in the storage device 110 and/or provide, the transformed data to the graphics unit 135. In this manner, the 3D manipulation performed by the host processor of the computer system is provided at an increased speed. The present invention thus facilitates the performance of an intra-add operation through the use of available instruction sequences.

While several examples uses of intra-add operations have been described, it is to understood that the invention is not limited to these uses. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer system comprising:
   a hardware unit to transmit data representing graphics to another computer or a display;
   a processor coupled to the hardware unit; and
   a storage device coupled to the processor and having stored therein a routine, which when executing by the processor, causes the processor to generate said data, said routine at least causing said processor to at least,
   access a first packed data operand having N data elements, N being a positive integer; and
   add horizontally the N data elements in the first packed data operand to produce a horizontal sum packed data operand having N identical result elements, each result element being equal to sum of the N data elements.

2. The computer system of claim 1, wherein said routine causing said processor to add horizontally the N data elements causes said processor to:
   (a) swap the N data elements in the first packed data operand to generate a second packed data operand; and
   (b) add vertically the first and second packed data operands to generate a third packed data operand.

3. The computer system of claim 2, wherein said routine causing said processor to add horizontally the N data elements further causes said processor to:
   (c) copy the third packed data operand to the first data operand; and
   (d) iterate (a) and (b) until the third data operand has N identical data elements.

4. The computer system of claim 3, wherein said data elements are packed floating point data elements.

5. The computer system of claim 3, wherein said data elements are packed integer data elements.

6. A method comprising:
   accessing data representative of a first three-dimensional image;
   altering said data to generate a second three-dimensional image, said altering comprising:
      accessing a first packed data operand having N data elements N being a positive integer; and
      adding horizontally the N data elements in the first packed data operand to produce a horizontal sum packed data operand having N identical result elements, each result element being equal to sum of the N data elements.

7. The method of claim 6, wherein adding horizontally the N data elements comprises:
   (a) swapping the N data elements in the first packed data operand to generate a second packed data operand and
   (b) adding vertically the first and second packed data operands to generate a third packed data operand.

8. The method of claim 7, wherein adding horizontally the N data elements further comprises:
- (c) copying the third packed data operand to the first data operand; and
- (d) iterating (a) and (b) until the third data operand has N identical data elements.

9. The method of claim 6, wherein altering includes performing a dot product operation on said data.

10. The method of claim 6, wherein altering includes performing three-dimensional transformation.

11. A method comprising accessing data representative of a first three-dimensional object;

altering said data to generate a second three-dimensional object, said altering comprising:
- accessing a vector as a vector packed data operand having N vector data elements, N being a positive integer,
- for each row of a matrix,
  - accessing the row as a row packed data operand having N row data elements,
  - multiplying respective elements of the row and vector packed operands to generate a first packed data operand and
  - adding horizontally the N data elements in the first packed data operand to produce a horizontal sum packed data operand having N identical result elements each result element, being equal to sum of the N data elements.

12. The method of claim 11, wherein adding horizontally the N data elements comprises:
- (a) swapping the N data elements in the first packed data operand to generate a second packed data operand; and
- (b) adding vertically the first and second packed data operands to generate a third packed data operand.

13. The method of claim 12, wherein adding horizontally the N data elements further comprises:
- (c) copying the third packed data operand to the first data operand and
- (d) iterating (a) and (b) until the third data operand has N identical data elements.

14. A method comprising:

accessing a first packed data operand having four data elements; and adding horizontally the four data elements in the first packed data operand to produce a horizontal sum packed data operand having four identical result elements, each result element being equal to sum of the four data elements.

15. The method of claim 14, wherein adding horizontally the N data elements comprises:
- (a) swapping the four data elements in the first packed data operand to generate a second packed data operand;
- (b) adding vertically the first and second packed data operands to generate a third packed data operand having four data elements;
- (c) swapping the four data elements in the third packed data operand to generate a fourth packed data operand; and
- (d) adding vertically the third and fourth packed data operands to generate the horizontal sum packed data operand.

* * * * *